United States Patent
Endo et al.

(10) Patent No.: US 6,865,019 B2
(45) Date of Patent: Mar. 8, 2005

(54) AMPLIFICATION OPTICAL FIBER AND FIBER OPTIC AMPLIFIER INCLUDING THE SAME

(75) Inventors: Soichi Endo, Yokohama (JP); Kazuhiro Okamoto, Yokohama (JP); Masahiro Takagi, Yokohama (JP); Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 567 days.

(21) Appl. No.: 09/988,633

(22) Filed: Nov. 20, 2001

(65) Prior Publication Data

US 2002/0081085 A1 Jun. 27, 2002

(30) Foreign Application Priority Data

Dec. 26, 2000 (JP) .................................... P2000-395546
Oct. 12, 2001 (JP) .................................... P2001-315450

(51) Int. Cl.[7] .............................................. H01S 3/00
(52) U.S. Cl. .................................................. 359/341.1
(58) Field of Search ........................... 359/341.1; 372/6

(56) References Cited

U.S. PATENT DOCUMENTS

| | | | |
|---|---|---|---|
| 5,838,867 A | | 11/1998 | Onishi et al. |
| 6,266,467 B1 | * | 7/2001 | Kato et al. .................. 385/123 |
| 6,684,016 B2 | * | 1/2004 | Kim et al. .................. 385/123 |
| 6,693,737 B2 | * | 2/2004 | Islam .......................... 359/334 |

FOREIGN PATENT DOCUMENTS

| | | |
|---|---|---|
| JP | 10-242556 | 9/1998 |
| JP | 10-339819 | 12/1998 |
| JP | 2001255563 A * | 9/2001 |
| JP | 2002162529 A * | 6/2002 |
| WO | WO 00/74184 | 7/2000 |

OTHER PUBLICATIONS

Jun–ichi Kani, et al., "Nonlinear Optical Effects and Their Suppression Techniques in Ultra Wide–Band WDM Transmission Systems," 1998, NTT Optical Networks Systems Laboratories, p. 566.
G.P. Agrawal, "Nonlinear Fiber Optics," Second Edition, Academic Press, pp. 34–36, 1995.

* cited by examiner

Primary Examiner—Mark Hellner
(74) Attorney, Agent, or Firm—McDermott Will & Emery LLP

(57) ABSTRACT

The invention relates to an amplification optical fiber that is suitable for amplification of signals in the L-band, that has the effect of suppressing normal four-wave mixing (FWM) occurring between signals, and that has the structure for effectively suppressing occurrence of non-degenerative FWM as well, and a fiber optic amplifier including the same. A fiber optic amplifier according to the present invention incorporates an amplification optical fiber having a core region doped with a rare earth element, a zero-dispersion wavelength of not more than a wavelength of pumping light, and an effective cutoff wavelength of 1.1 μm or more but not more than the wavelength of the pumping light. Not only the normal FWM but also the non-degenerative FWM is effectively suppressed by application of the amplification optical fiber.

16 Claims, 12 Drawing Sheets

| | RELATIVE REFRACTIVE INDEX DIFFERENCE Δn (%) | EFFECTIVE CUTOFF WAVELENGTH(μm) | ZERO-DISPERSION WAVELENGTH(μm) | MODE FIELD DIAMETER(μm) AT 1.55μm | Er CONCENTRATION (wt.ppm) | Al CONCENTRATION (wt%) |
|---|---|---|---|---|---|---|
| EDF1 | 1.12 | 1.37 | 1.38 | 5.74 | 912 | 3.9 |
| EDF2 | 1.34 | 1.28 | 1.57 | 5.46 | 1140 | 6.2 |
| EDF3 | 0.71 | 0.83 | 1.65 | 7.81 | 790 | 3.5 |

Fig.8

| | RELATIVE REFRACTIVE INDEX DIFFERENCE Δn (%) | EFFECTIVE CUTOFF WAVELENGTH(μm) | ZERO-DISPERSION WAVELENGTH(μm) | MODE FIELD DIAMETER(μm) AT 1.55 μm | Er CONCENTRATION (wt.ppm) | Al CONCENTRATION (wt%) |
|---|---|---|---|---|---|---|
| EDF1 | 1.12 | 1.37 | 1.38 | 5.74 | 912 | 3.9 |
| EDF2 | 1.34 | 1.28 | 1.57 | 5.46 | 1140 | 6.2 |
| EDF3 | 0.71 | 0.83 | 1.65 | 7.81 | 790 | 3.5 |

AMPLIFICATION OPTICAL FIBER AND FIBER OPTIC AMPLIFIER INCLUDING THE SAME

BACKGROUND OF THE INVENTION

1. Field of the Invention

The present invention relates to an amplification optical fiber for amplifying signals under supply of pumping light and a fiber optic amplifier including the same.

2. Related Background Art

The fiber optic amplifiers are optical devices to which a silica-based amplification optical fiber with a core region, an equivalent of an optical waveguide region, doped with a rare earth element is applied as an optical amplifying medium and in which the amplification optical fiber amplifies signals under supply of pumping light. For example, in the case of the fiber optic amplifier (EDFA: Erbium-Doped Fiber Amplifier) making use of the amplification optical fiber (EDF: Erbium-Doped Fiber) with the core region doped with the element Er as a rare earth element, when the pumping light having the wavelength of 1.48 $\mu$m is supplied into the EDF, signals in the C-band (wavelengths of 1.53 $\mu$m to 1.56 $\mu$m) or in the L-band (wavelengths of 1.57 $\mu$m to 1.67 $\mu$m) are amplified in the EDF.

For increasing transmission capacity of information, transmission is also pursued through wavelength division multiplexing (WDM) to transmit signals of multiple channels (signals of mutually different wavelengths) in a multiplex form. The multiplexed signals (WDM signals) of multiple channels used in the WDM transmission heretofore have been signals belonging to the C-band, but research has also been conducted on use of multiplexed signals belonging to the L-band in order to meet demands for further increase of capacity. Narrowing the wavelength spacing (signal channel spacing) between multiplexed signals is also under research as one of means for further increase of transmission capacity.

Since the EDFA can amplify the multiplexed signals (WDM signals) belonging to the C-band or the L-band en bloc, it is also suitable for the WDM transmission systems in the C-band or in the L-band. In this EDFA, however, there arises a problem of occurrence of four-wave mixing (hereinafter referred to as FWM) being a kind of nonlinear optical phenomena. Namely, the multiplexed signals of multiple channels amplified in the EDF have high power and narrow wavelength spacing. In addition, the mode field diameter of EDF is smaller than those of the normal transmission optical fibers. For these reasons, FWM is easy to occur in the EDF. With occurrence of FWM, there will occur waveform degradation of each signal, which will result in degradation of transmission quality.

Japanese Patent Application Laid-Open No. H10-242556 discloses the EDF for suppressing the occurrence of FWM. The EDF disclosed in this Application has the effective core diameter of 9 $\mu$m or more at the wavelength of 1.55 $\mu$m and the zero-dispersion wavelength outside the range of 1.53 $\mu$m to 1.56 $\mu$m. The EDFA incorporating this EDF can amplify the multiplexed signals of multiple channels in the C-band en bloc and suppress occurrence of FWM on that occasion.

SUMMARY OF THE INVENTION

The inventors conducted intensive and extensive research on the conventional fiber optic amplifiers and found the following problems. Namely, when the signal amplification is also effected in the L-band as well as in the C-band, there arises a problem of the nonlinear optical phenomena between the bands, particularly, non-degenerative FWM, and there also arises a problem of non-degenerative FWM between each signal and pumping light. The non-degenerative FWM is a nonlinear optical phenomenon caused when the phase matching condition is met in arrangement of light of two wavelengths with the zero-dispersion wavelength in between. However, the EDF disclosed in No. H10-242556 is provided with no countermeasures against the non-degenerative FWM and thus includes a possibility of causing degradation of signal waveform due to the non-degenerative FWM so as to result in degradation of transmission quality.

Particularly, in the case of the EDFA for amplifying the multiplexed signals belonging to the L-band, occurrence of the non-degenerative FWM will pose a problem. Namely, the EDFA for the L-band increases the total optical power of signals with increase in the number of channels and has a smaller gain per unit length, as compared with the EDFA for the C-band. Therefore, the L-band EDFA needs to include the EDF of long length (about five to ten times the length of the EDF applied to the C-band EDFA) and requires a large power of pumping light because of the poor amplification efficiency. For this reason, the non-degenerative FWM readily occurs in the L-band EDFA because of the high optical energy density per unit cross section of the EDF and the long length of the EDF.

The present invention has been accomplished in order to solve the problems as described above and an object of the invention is to provide an amplification optical fiber that is suitable for the signal amplification in the L-band, that has the effect of suppressing the normal FWM occurring between signals, and that has the structure of effectively suppressing the occurrence of non-degenerative FWM as well, and a fiber optic amplifier including the same.

An amplification optical fiber according to the present invention is an optical fiber which has a core region doped with a rare earth element and which amplifies signals under supply of pumping light. The region doped with the rare earth element does not always have to be the entire core region, but a part of the core region may be doped with the rare earth element. Particularly, the amplification optical fiber has a zero-dispersion wavelength of not more than a wavelength of the pumping light used, specifically 1.5 $\mu$m or less, and an effective cutoff wavelength of 1.1 $\mu$m or more but not more than the wavelength of the pumping light used, specifically 1.1 $\mu$m or more but 1.5 $\mu$m or less.

On the other hand, a fiber optic amplifier according to the present invention comprises an amplification optical fiber having the above-stated structure (the amplification optical fiber according to the present invention), and a pumping light source for supplying pumping light of a predetermined wavelength. In this case, the upper limit of the zero-dispersion wavelength and the upper limit of the effective cutoff wavelength of the amplification optical fiber are defined by the wavelength of the pumping light. The fiber optic amplifier according to the present invention may comprise a plurality of amplification optical fibers connected in a multistage configuration, and a pumping light supply system including one or more pumping light sources for supplying pumping light to the plurality of amplification optical fibers. In this case, it is preferable to apply the amplification optical fiber according to the present invention to at least an amplification optical fiber located in the final stage in the traveling direction of signal. The fiber optic amplifiers of the invention all are suitable for the signal amplification in the L-band, have the effect of suppressing the normal FWM occurring between signals, and also effectively suppress the occurrence of the non-degenerative FWM. Particularly, in the case of the fiber optic amplifier comprising the plurality of amplification optical fibers connected in the multistage configuration, since the amplification optical fiber according to the present invention is applied to at least the amplification optical fiber located in the final stage where the optical power of signal becomes maximum, it becomes feasible to suppress the occurrence of non-degenerative FWM more effectively.

In the amplification optical fiber according to the present invention, when the zero-dispersion wavelength and effective cutoff wavelength are set in their respective ranges as described above, the occurrence of non-degenerative FWM is suppressed. In the specification of the present application, the effective cutoff wavelength refers to a cutoff wavelength at the length of 2 m according to the standard of ITU-T.

In the amplification optical fiber according to the present invention, the rare earth element introduced into the core region (also in the case of doping a part of the core region) is preferably erbium (Er). In this case, the signal amplification becomes feasible in the C-band or in the L-band.

Further, in the amplification optical fiber according to the present invention, a concentration of Er introduced into the core region is 3000 weight parts per million (wt.ppm) or less, preferably 2500 wt.ppm or less, and more preferably 2000 wt.ppm or less. An absorption loss at the wavelength of 1.53 $\mu$m is 10 dB/m or more. Since this enables the amplification optical fiber to be shortened without causing concentration quenching, the amplification optical fiber can be utilized as an optical amplifying medium in the L-band EDFA.

In the amplification optical fiber according to the present invention, the mode field diameter at the wavelength of 1.55 $\mu$m is 4.0 $\mu$m or more but 9.0 $\mu$m or less and preferably 4.0 $\mu$m or more but 7.5 $\mu$m or less. When the mode field diameter is set in the foregoing range, the occurrence of nonlinear optical phenomena is further suppressed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 8 is a table presenting a list of specifications for three types of samples EDF1, EDF2, and EDF3.

DESCRIPTION OF THE PREFERRED EMBODIMENTS

Each of embodiments of the amplification optical fiber and the fiber optic amplifier including the same according to the present invention will be described below with reference to FIGS. 1, 2A, 2B, and 3 to 13. Throughout the description of the drawings the same elements will be denoted by the same reference symbols and redundant description will be omitted.

First Embodiment

Figure 1:
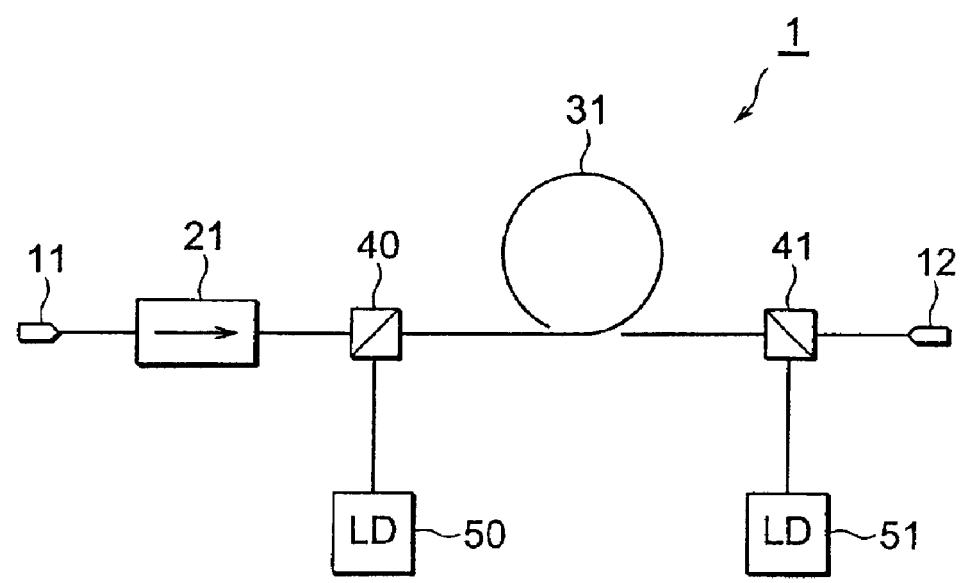
FIG. 1 is a view showing the structure of the first embodiment of the fiber optic amplifier according to the present invention.

First, the first embodiment of the amplification optical fiber and the fiber optic amplifier according to the present invention will be described. FIG. 1 is a view showing the structure of the fiber optic amplifier 1 in the first embodiment. This fiber optic amplifier 1 is provided with an optical isolator 21, an optical coupler 40, an amplification optical fiber 31, and an optical coupler 41 in the order named from an input end 11 to an output end 12.

A pumping light source 50 is connected to the optical coupler 40 and a pumping light source 51 to the optical coupler 41. The optical isolator 21 allows light to pass in the forward direction directed from the input end 11 to the optical coupler 40, but does not allow light to pass in the backward direction. The amplification optical fiber 31 is a silica-based optical fiber for amplifying multiplexed signals of multiple channels (e.g., light of wavelengths belonging to the C-band or the L-band) under supply of pumping light (e.g., light of the wavelength of 1.48 $\mu$m), in which at least a part of the core region is doped with a rare earth element (e.g., the element Er). The optical coupler 40 outputs the pumping light coming from the pumping light source 50, into the amplification optical fiber 31 and outputs the signals from the optical isolator 21 into the amplification optical fiber 31. The optical coupler 41 outputs the pumping light coming from the pumping light source 51, into the amplification optical fiber 31 and outputs the signals from the amplification optical fiber 31 to the output end 12. Each of the pumping light sources 50, 51 is, for example, a semiconductor laser light source and emits the pumping light of a wavelength that can pump the rare earth element as a dopant in the amplification optical fiber 31.

In this fiber optic amplifier 1, the pumping light emitted from the pumping light source 50 is supplied via the optical coupler 40 and in the forward direction to the amplification optical fiber 31. The pumping light emitted from the pumping light source 51 is supplied via the optical coupler 41 and in the backward direction to the amplification optical fiber 31. The multiplexed signals entering the input end 11 propagate through the optical isolator 21 and the optical coupler 40 into the amplification optical fiber 31 to be amplified therein. Then the multiplexed signals outputted from the amplification optical fiber 31 (the amplified multiplexed signals) propagate through the optical coupler 41 to be outputted from the output end 12.

Figure 2A:
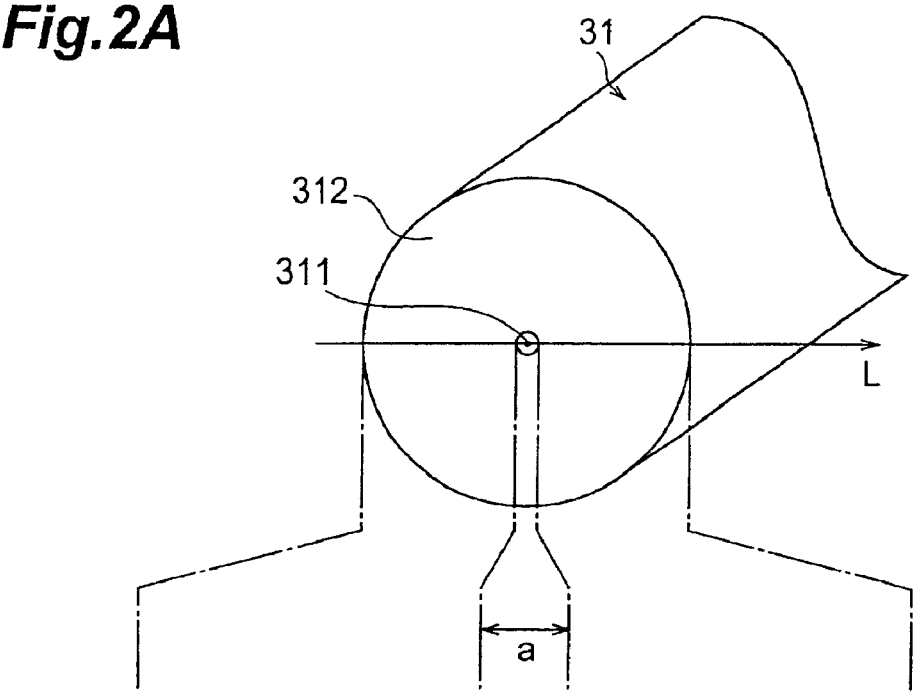
FIG. 2A is a view showing an example of the cross-sectional structure of the amplification optical fiber according to the present invention, and FIG. 2B a refractive index profile of the amplification optical fiber shown in FIG. 2A.
Figure 2B:
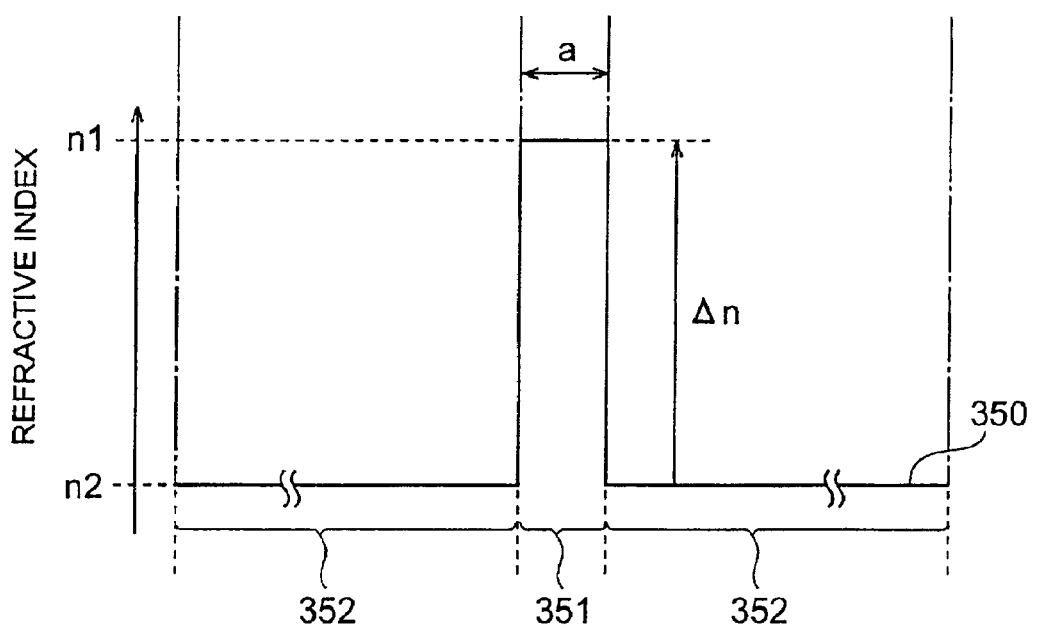

FIG. 2A is a view showing an example of the cross-sectional structure in the amplification optical fiber 31. As shown in FIG. 2A, the amplification optical fiber 31 comprises a core region 311 extending along a predetermined axis and having a refractive index n1 and an outside diameter a, and a cladding region 312 disposed around the outer periphery of the core region 311 and having a refractive index n2 (<n1). FIG. 2B shows a refractive index profile of the amplification optical fiber shown in FIG. 2A. This refractive index profile 350 indicates refractive indices of respective portions along a line L (a line perpendicular to the optical axis of the amplification optical fiber 31) in FIG. 2A, in which a region 351 represents a refractive index of a part located on the line L in the core region 311 and a region 352 a refractive index of portions located on the line L in the cladding region 312.

A relative refractive index difference Δn between the core region 311 of the refractive index n1 and the cladding region 312 of the refractive index n2 is given by Eq (1) below.

$$\Delta n = ((n1)^2 - (n2)^2)/2(n1)^2 \quad (1)$$

The cross-sectional structure and refractive index profile shown in FIGS. 2A and 2B are a typical example for realizing the amplification optical fiber 31 according to the present invention, and a variety of modifications can be contemplated. Refractive index profiles applicable to the amplification optical fiber 31 include those shown in FIGS. 7 to 9 of U.S. Pat. No. 5,838,867, for example. These refractive index profiles include those of fibers in which the core region 311 comprises a single glass layer and those of fibers in which the core region comprises a plurality of glass layers with different indices. In either case, the whole of the core region 311 does not always have to be doped with the rare earth element, but at least a part of the core region 311 needs to be doped with the rare earth element.

Particularly, the amplification optical fiber 31 of the first embodiment (the amplification optical fiber according to the present invention) has the zero-dispersion wavelength of not more than the wavelength of the pumping light, specifically 1.5 μm or more, and the effective cutoff wavelength of 1.1 μm or more but not more than the wavelength of the pumping light, specifically 1.1 μm or more but 1.5 μm or less. Since the zero-dispersion wavelength is not more than the wavelength of the pumping light, light beams of either two wavelengths among the pumping light and the multiplexed signals of plural channels are prevented from being arranged with the zero-dispersion wavelength in between on the wavelength axis. This suppresses the occurrence of non-degenerative FWM. Since the effective cutoff wavelength of the amplification optical fiber 31 is not more than the wavelength of the pumping light, the single mode is also ensured at the wavelength of the pumping light in the amplification optical fiber 31. On the other hand, since the effective cutoff wavelength of the amplification optical fiber 31 is 1.1 μm or more, the bending loss is small in the amplification optical fiber 31.

Figure 3:
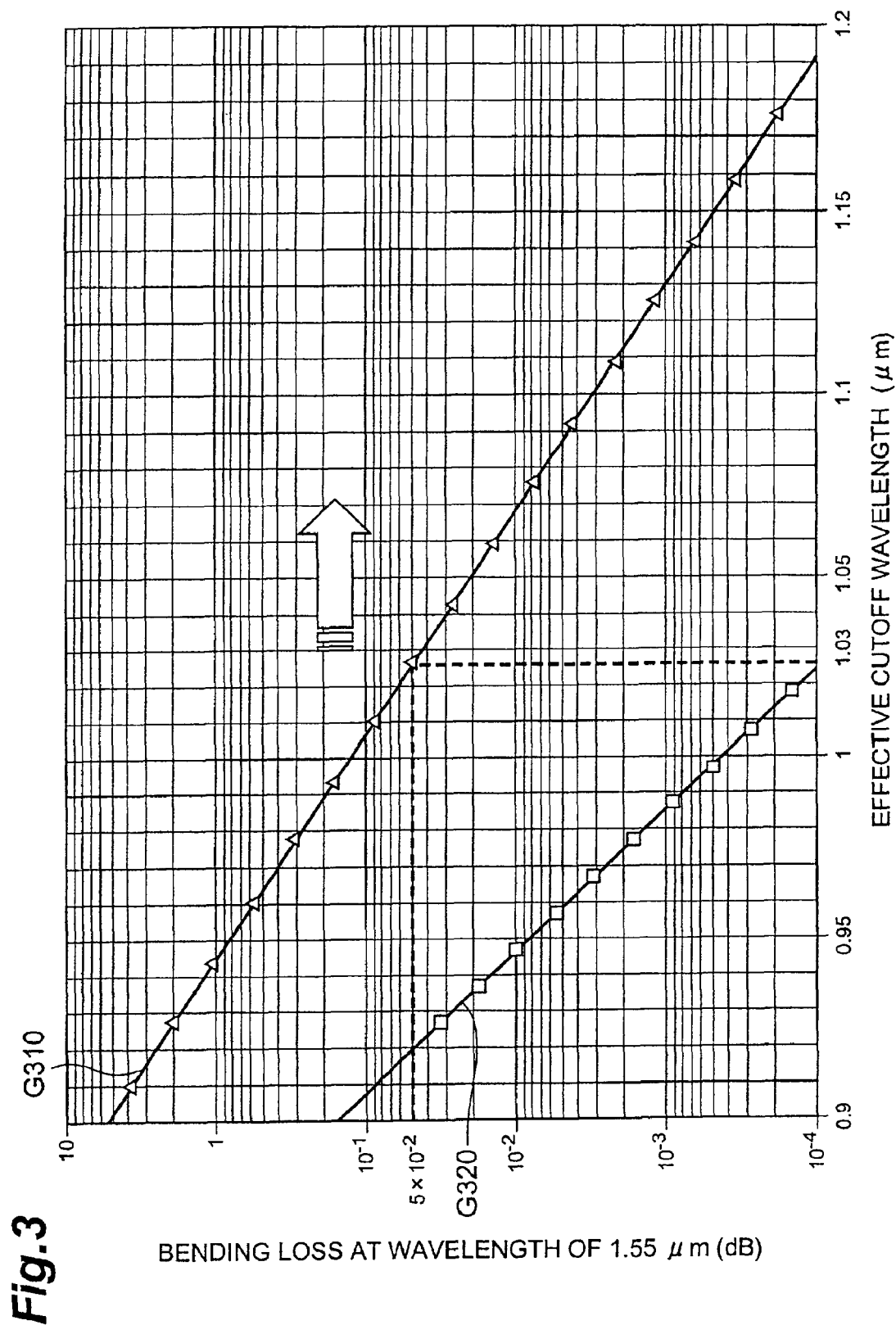
FIG. 3 is a graph showing the relation between effective cutoff wavelength and bending loss at the wavelength of 1.55 $\mu$m, for plural samples of the amplification optical fiber shown in FIGS. 2A and 2B.

The bending loss of the amplification optical fiber 31 is largely dependent upon the structure of the amplification optical fiber 31. Namely, the longer the effective cutoff wavelength and the larger the relative refractive index difference Δn, the smaller the bending loss. Meanwhile, since the fiber optic amplifier 1 is modularized, the amplification optical fiber 31 is kept in a wound state on a bobbin or in a bundled state, and the diameter of winding is desirably as small as possible in terms of encapsulation. FIG. 3 is a graph showing the relation between effective cutoff wavelength and bending loss at the wavelength of 1.55 μm, for plural samples of this amplification optical fiber 31. The samples prepared are a sample with the relative refractive index difference Δn of 0.7% and a sample with the relative refractive index difference Δn of 0.5%. Plot G310 indicates the foregoing relation in the sample with the relative refractive index difference Δn of 0.5%, while plot G320 the foregoing relation in the sample with the relative refractive index difference Δn of 0.7%. These samples both have the length of 67 m, the absorption loss of 10 dB/m at the wavelength of 1.53 μm, and the unsaturated absorption of 1000 dB, and they are measured in a wound state in the diameter of 35 mm (winding diameter). The measurement wavelength is 1.55 μm (1550 nm).

It is seen from this graph that when the effective cutoff wavelength is 1.03 μm or more, the bending loss at the wavelength of 1.55 μm in the amplification optical fiber 31 is 0.05 dB or less and that when the effective cutoff wavelength is 1.1 μm or more, the bending loss at the wavelength of 1.55 μm in the amplification optical fiber 31 is 0.003 dB or less.

Figure 4:
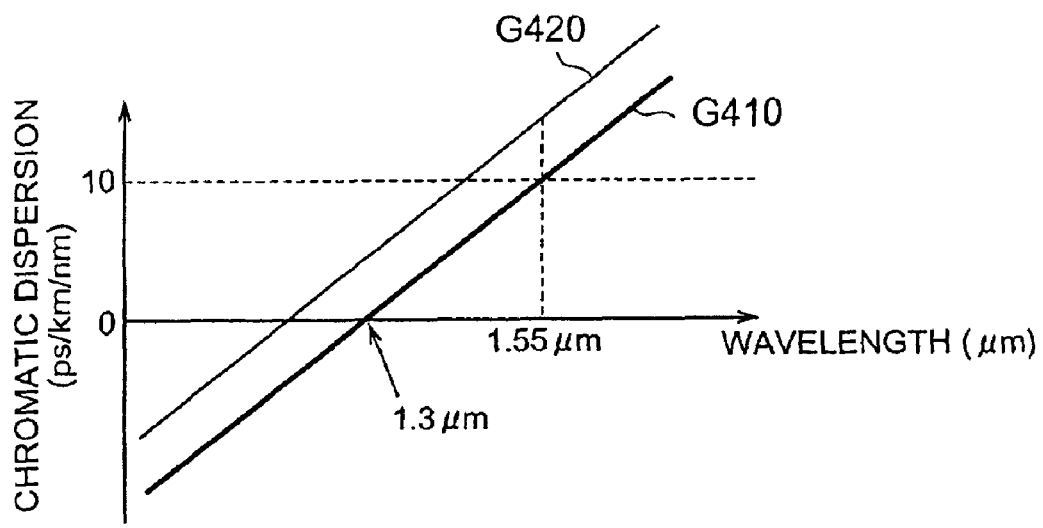
FIG. 4 is a graph showing chromatic dispersion characteristics of the amplification optical fiber shown in FIGS. 2A and 2B, together with a comparative example.

The following can be further stated as to the zero-dispersion wavelength of the amplification optical fiber 31. In ultrafast transmission over the bit rate of 40 Gbps, signals of wavelengths a little apart from the zero-dispersion wavelength suffer degradation of their waveforms because of influence of chromatic dispersion. Supposing the absolute value of chromatic dispersion tolerable for the amplification optical fiber 31 is 1 ps/nm or less, since the maximum length of the amplification optical fiber 31 is about 100 m, the zero-dispersion wavelength of the amplification optical fiber 31 is desirably 1.3 μm or more. FIG. 4 is a graph showing the chromatic dispersion characteristics of the amplification optical fiber. Plot G420 indicates the chromatic dispersion characteristics of an optical fiber as a comparative example, and the optical fiber of the comparative example has the zero-dispersion wavelength of less than 1.3 μm and the chromatic dispersion of 10 ps/km/nm over at the wavelength of 1.55 μm. In contrast to it, plot G410 indicates the chromatic dispersion characteristics of the amplification optical fiber 31 according to the first embodiment, and the amplification optical fiber 31 has the zero-dispersion wavelength of 1.3 μm or more and the chromatic dispersion of 10 ps/km/nm or less at the wavelength of 1.55 μm.

At least a part of the core region 311 in the amplification optical fiber 31 is doped with the element Er as a rare earth element, and in the amplification optical fiber 31 the concentration of the Er dopant in the core region 311 is 3000 wt.ppm or less, preferably 2500 wt.ppm or less, and more preferably 2000 wt.ppm or less. The absorption loss at the wavelength of 1.53 μm is 10 dB/m or more. This structure enables the amplification optical fiber 31 to amplify signals in the C-band or the L-band. The amplification optical fiber 31 can be shortened without occurrence of concentration quenching, which permits the amplification optical fiber 31 to be applied as a medium for optical amplification in the L-band EDFA.

The concentration (wt.ppm) of the Er dopant in the core region 311 of the amplification optical fiber 31 is derived from Saturation Parameter as follows. Namely, the Er content Nt ($m^{-3}$) in the amplification optical fiber 31 can be approximately derived by Eq (2) below.

$$Nt = \zeta \cdot \tau / (\pi \cdot b^2) \quad (2)$$

In this equation, $\zeta$ indicates Saturation Parameter ($s^{-1} \cdot m^{-2}$), $\tau$ the fluorescence life (ms), and b the radius of the region doped with Er. Saturation Parameter $\zeta$ is obtained by actual measurement and the fluorescence life $\tau$ is often represented by a typical value of 10 ms. The radius b of the doped region is readily calculated from the cutoff wavelength and the mode field diameter at the wavelength of 1.55 μm. Under such conditions, the Er content Nt ($m^{-3}$) can be converted to the Er concentration Ns (wt.ppm) by Eq (3) below, using the density D of glass ($SiO_2$) (=2.86 g/cm³), the mass Z of 1 mol of $Er^{3+}$(=167.3 g), and the Avogadro's number N (=6.02×10²³).

$$Ns \text{ (wt.ppm)} = Nt \text{ } (m^{-3}) \cdot Z / (D \cdot N) \quad (3)$$

Figure 5:
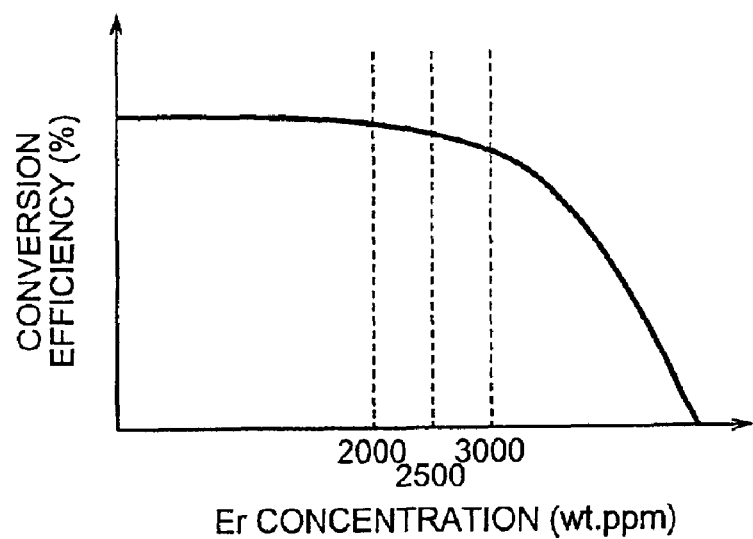
FIG. 5 is a graph showing the relation between conversion efficiency and Er concentration, for the amplification optical fiber shown in FIGS. 2A and 2B.

The amplification optical fiber 31 can be shortened more as the concentration of the rare earth element (Er) introduced into the optical waveguide region becomes higher. However, if the Er concentration is too high, the amplification performance will be degraded due to interaction between Er ions. FIG. 5 is a graph showing the relation between conversion efficiency and Er concentration in the amplification optical fiber 31. The conversion efficiency here refers to an efficiency of conversion from pumping light energy to signal energy, and the higher the conversion efficiency, the higher the amplification performance of the fiber. As seen from this graph, when the Er concentration is 3000 wt.ppm or less, the conversion efficiency is high in the amplification optical fiber 31. When the Er concentration is 2500 wt.ppm or less and, moreover, when the Er concentration is 2000 wt.ppm or less, it becomes feasible to gain the high conversion efficiency more stably. It is also preferable to codope the core region with the element Al in the concentration of 1 wt % or more and, preferably, 3 wt % or more, together with Er.

In addition, the amplification optical fiber 31 has the mode field diameter of 4.0 μm or more but 9.0 μm or less and, preferably, 4.0 μm or more but 7.5 μm or less at the wavelength of 1.55 μm. This can further suppress the occurrence of the nonlinear optical phenomena.

Figure 6:
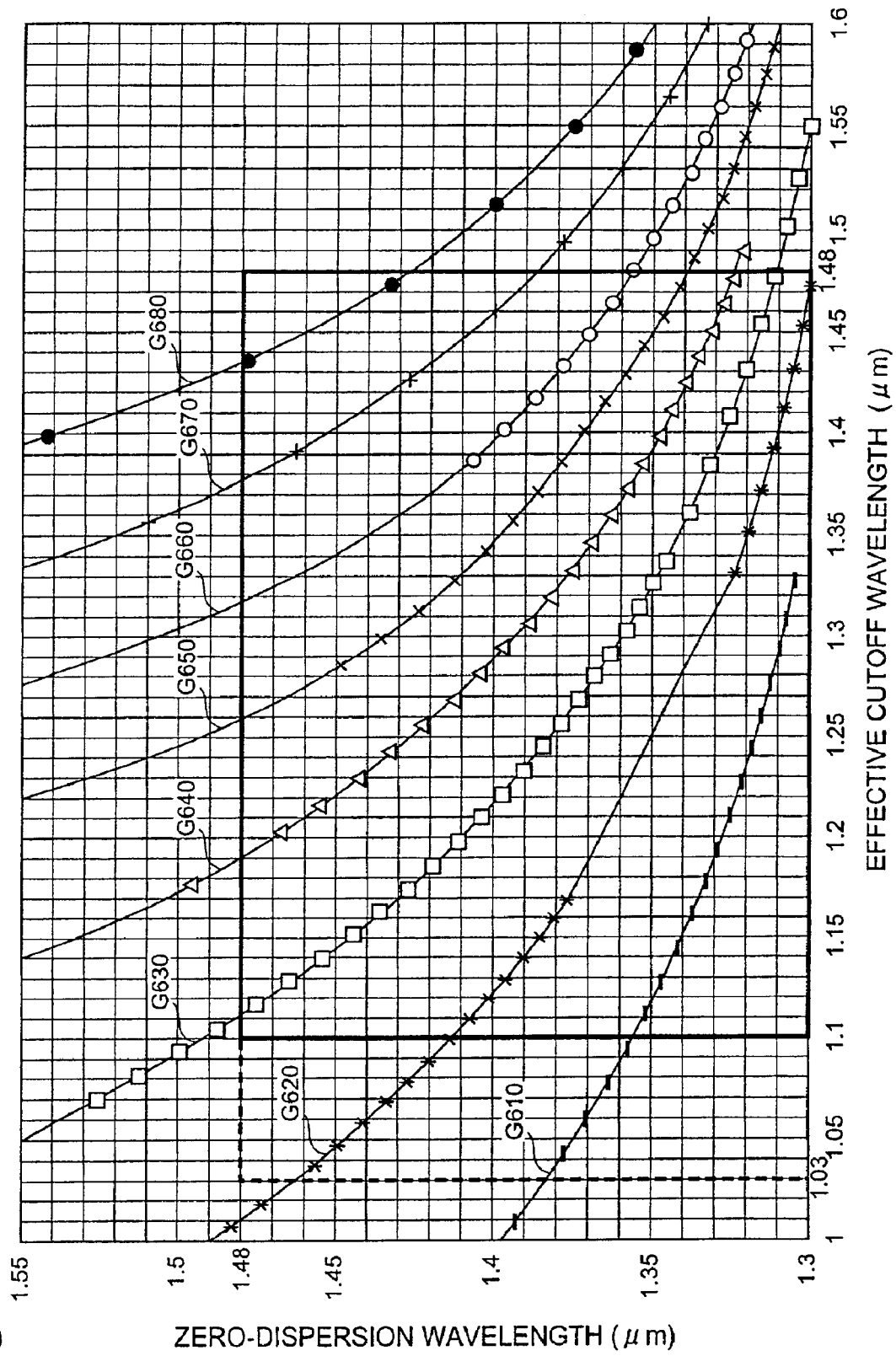
FIG. 6 is a graph showing the relation between zero-dispersion wavelength and effective cutoff wavelength, for plural samples of the amplification optical fiber shown in FIGS. 2A and 2B.
Figure 7:
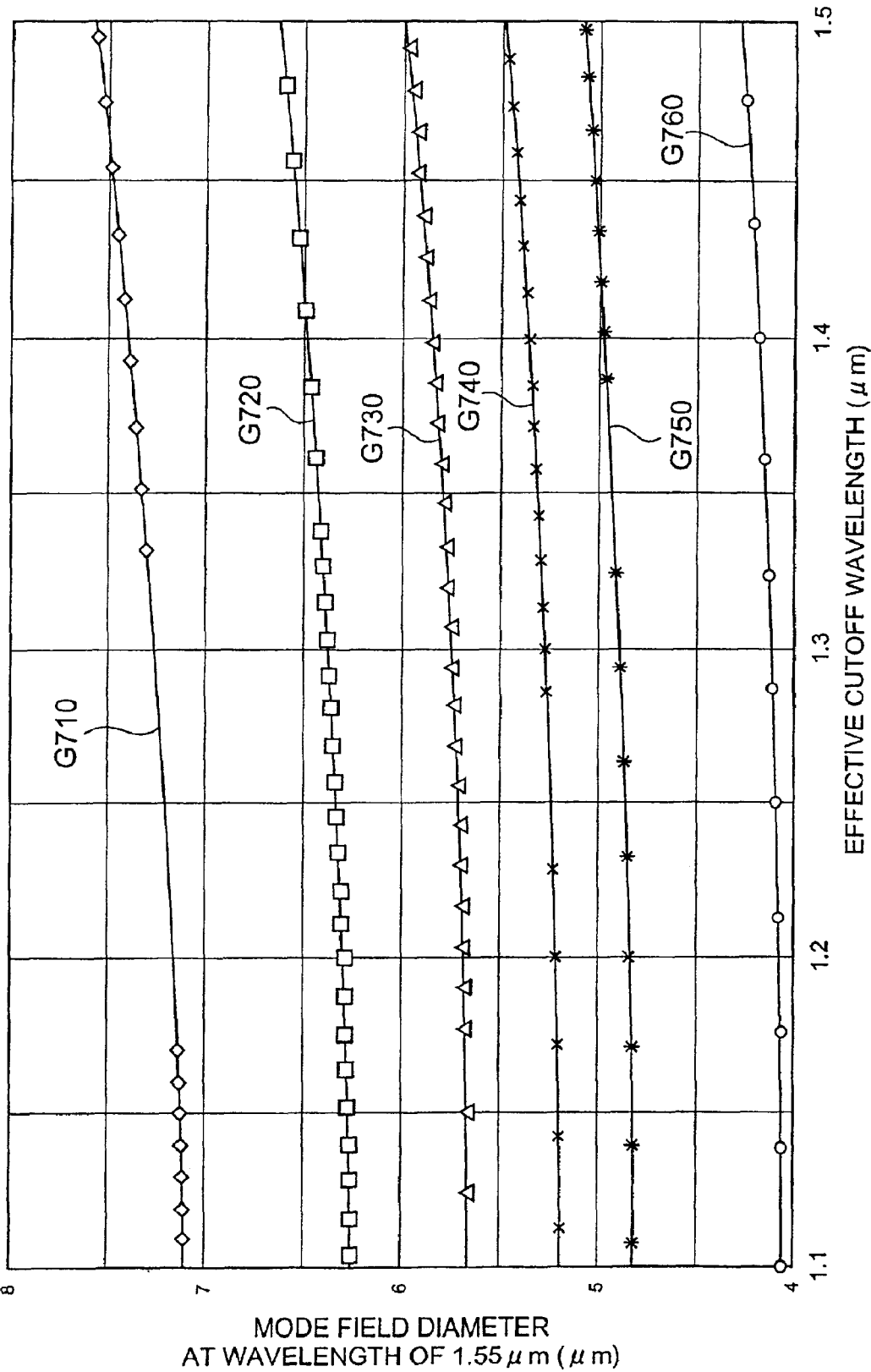
FIG. 7 is a graph showing the relation between effective cutoff wavelength and mode field diameter at the wavelength of 1.55 $\mu$m, for plural samples of the amplification optical fiber shown in FIGS. 2A and 2B.

The mode field diameter is given by the defining equation of Petermann II of ITU-T. FIG. 6 is a graph showing the relation between zero-dispersion wavelength and effective cutoff wavelength, for plural samples equivalent to the amplification optical fiber 31. FIG. 7 is a graph showing the relation between effective cutoff wavelength and mode field diameter at the wavelength of 1.55 μm, for some of these samples.

In FIG. 6, plot 610 indicates the foregoing relation for a sample with the relative refractive index difference Δn of 0.5%, plot 620 that for a sample with the relative refractive index difference Δn of 0.7%, plot 630 that for a sample with the relative refractive index difference Δn of 0.9%, plot 640 that for a sample with the relative refractive index difference Δn of 1.1%, plot 650 that for a sample with the relative refractive index difference Δn of 1.3%, plot 660 that for a sample with the relative refractive index difference Δn of 1.5%, plot 670 that for a sample with the relative refractive index difference Δn of 1.8%, and plot 680 that for a sample with the relative refractive index difference Δn of 2.1%, respectively. In FIG. 7, plot 710 indicates the foregoing relation for the sample with the relative refractive index difference Δn of 0.7%, plot 720 that for the sample with the relative refractive index difference Δn of 0.9%, plot 730 that for the sample with the relative refractive index difference Δn of 1.1%, plot 740 that for the sample with the relative refractive index difference Δn of 1.3%, plot 750 that for the sample with the relative refractive index difference Δn of 1.5%, and plot 760 that for the sample with the relative refractive index difference Δn of 2.1%, respectively.

In FIG. 6 the region encompassed by a solid line indicates a range where the effective cutoff wavelength is 1.1 μm or more but 1.48 μm or less and the zero-dispersion wavelength is 1.3 μm or more but 1.48 μm or less. Moreover, in FIG. 6 the region encompassed by a dashed line indicates a range where the effective cutoff wavelength is 1.03 μm or more but 1.48 μm or less and the zero-dispersion wavelength is 1.3 μm or more but 1.48 μm or less. The lower limit 1.1 μm of the effective cutoff wavelength is a condition for suppressing increase of bending loss and the upper limit 1.48 μm of the effective cutoff wavelength is a condition for ensuring the single mode at the wavelength of the pumping light. The lower limit 1.3 μm of the zero-dispersion wavelength is a condition for suppressing the occurrence of chromatic dispersion at the signal wavelengths and the upper limit 1.48 μm of the zero-dispersion wavelength a condition for suppressing the occurrence of non-degenerative FWM.

Specific examples of the fiber optic amplifier 1 and the amplification optical fiber 31 will be described below. Fiber optic amplifiers prepared were those constructed by applying either of three types of EDF1, EDF2, and EDF3 as the amplification optical fiber 31. The pumping light source 50 for supplying the pumping light in the forward direction had the output wavelength of 1.48 μm and the output power of 360 mW. The pumping light source 51 for supplying the pumping light in the backward direction had the output wavelength of 1.48 μm and the output power of 270 mW. Multiplexed signals supplied to the input end 11 were two-channel signals (multiplexed signals of two wavelengths), in which one signal wavelength was 1574.5 nm belonging to the C-band and the other signal wavelength 1609.0 nm belonging to the L-band. The power of each signal input to the input end 11 was 0 dBm and the power of each signal output from the output end 12 was 22.3 dBm. The operating temperature was 25° C.

FIG. 8 is a table showing a list of specifications of the three types of EDF1, EDF2, and EDF3. EDF1 has the relative refractive index difference Δn of 1.12%, the effective cutoff wavelength of 1.37 μm, the zero-dispersion wavelength of 1.38 μm (not more than the wavelength of the pumping light), and the mode field diameter of 5.74 μm at the wavelength of 1.55 μm. In EDF1, the concentration of dopant Er in the core region 311 was 912 wt.ppm, and the concentration of Al was 3.9 wt %. EDF2 has the relative refractive index difference Δn of 1.34%, the effective cutoff wavelength of 1.28 μm, the zero-dispersion wavelength of 1.57 μm (between the wavelength of the pumping light and the signal wavelengths), and the mode field diameter of 5.46 μm at the wavelength of 1.55 μm. In EDF2, the concentration of dopant Er in the core region 311 was 1140 wt.ppm and the concentration of Al was 6.2 wt %. EDF3 has the relative refractive index difference Δn of 0.71%, the effective cutoff wavelength of 0.83 μm, the zero-dispersion wavelength of 1.65 μm (not less than the signal wavelengths), and the mode field diameter of 7.81 μm at the wavelength of 1.55 μm. In EDF3, the concentration of dopant Er in the core region 311 was 790 wt.ppm, and the concentration of Al 3.5 wt %.

Figure 9:
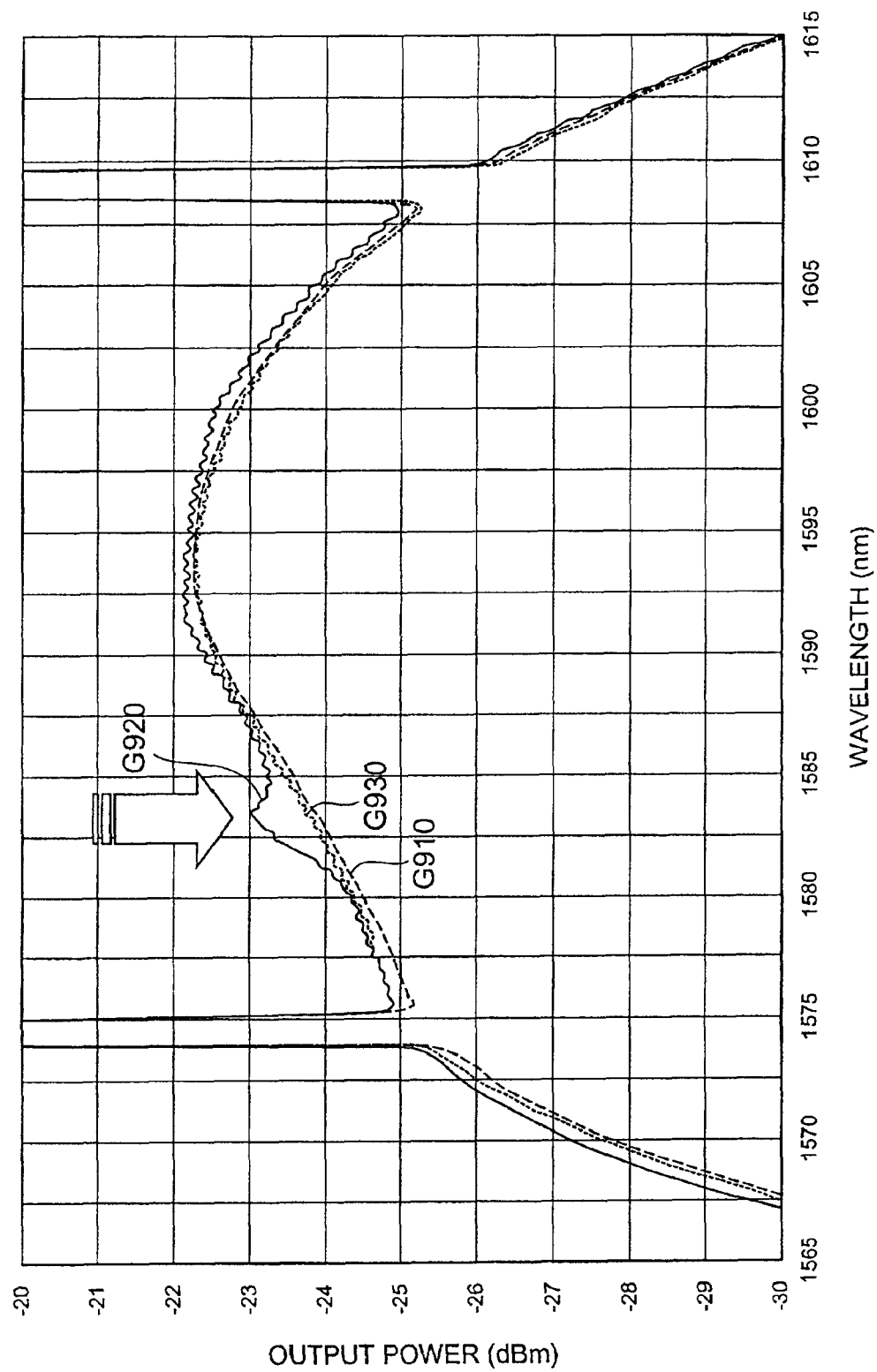
FIG. 9 shows power spectra of output light from respective fiber optic amplifiers making use of the three types of EDF1, EDF2, and EDF3.

FIG. 9 shows power spectra of output light from the respective fiber optic amplifiers to which the three types of EDF1, EDF2, and EDF3 are applied. Plot G910 indicates the power spectrum of output light from the fiber optic amplifier incorporating EDF1, plot G920 the power spectrum of output light from the fiber optic amplifier incorporating EDF2, and plot G930 the power spectrum of output light from the fiber optic amplifier incorporating EDF3.

As seen from these spectra, there appears a light component due to the non-degenerative FWM near the wavelength of 1583 nm (the part indicated by an arrow in FIG. 9) in the power spectrum of the fiber optic amplifier incorporating EDF2 the zero-dispersion wavelength of which exists between the wavelength of the pumping light and the signal wavelengths. In contrast to it, there appeared no influence of non-degenerative FWM in the power spectra of the fiber optic amplifiers incorporating EDF1 or EDF3 the zero-dispersion wavelength of which does not exist between the wavelength of the pumping light and the signal wavelengths. It was also verified that EDF3 had the bending loss as large as about 1.3 dB at the wavelength of 1.55 μm (in the winding diameter of 35 mm and the length of 67 m) because of its short effective cutoff wavelength of 0.83 μm and it would pose a problem in practical use.

Second Embodiment

Figure 10:
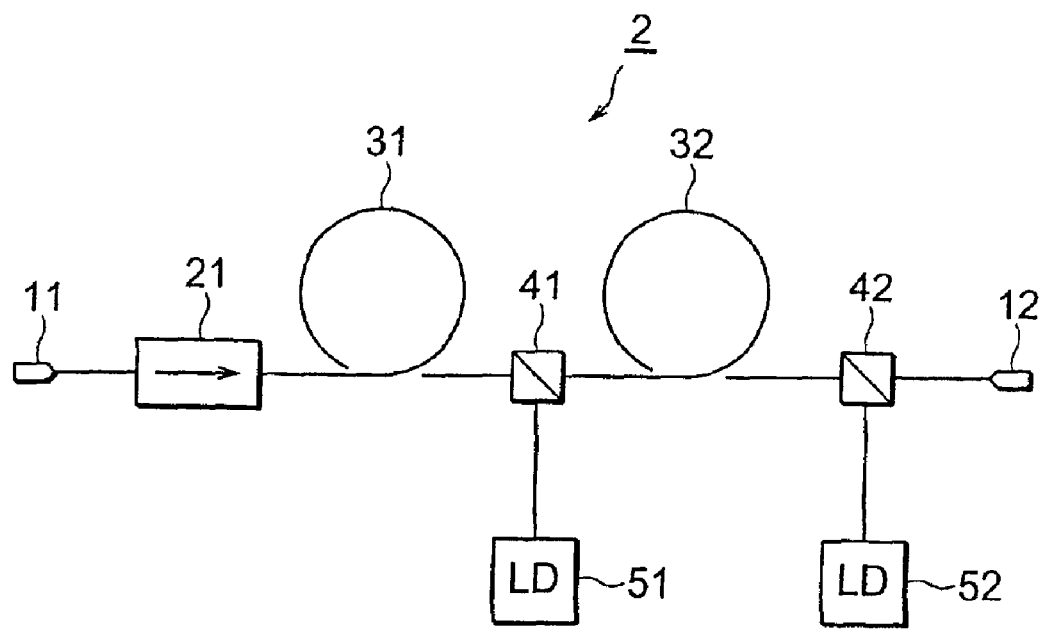
FIG. 10 is a view showing the structure of the second embodiment of the fiber optic amplifier for amplification according to the present invention.

The second embodiment of the amplification optical fiber and the fiber optic amplifier according to the present invention will be described below. FIG. 10 is a view showing the structure of the fiber optic amplifier 2 according to second embodiment. The fiber optic amplifier 2 is provided with an optical isolator 21, an amplification optical fiber 31, an optical coupler 41, an amplification-optical fiber 32, and an optical coupler 42 in the order named from the input end 11 to the output end 12.

A pumping light source 51 is connected to the optical coupler 41, and a pumping light source 52 to the optical coupler 42. The optical isolator 21 allows light to pass in the forward direction from the input end 11 to the amplification optical fiber 31, but does not allow light to pass in the backward direction. Each of the amplification optical fibers 31, 32 is a silica-based optical fiber, and the optical waveguide region thereof is doped with a rare earth element (e.g., the element Er). The fibers 31, 32 amplify signals (e.g., light belonging to the C-band or the L-band) under supply of the pumping light (e.g., light having the wavelength of 1.48 μm). The optical coupler 41 outputs the pumping light coming from the pumping light source 51, into the amplification optical fiber 31, and outputs the signals coming from the amplification optical fiber 31, into the amplification optical fiber 32. The optical coupler 42 outputs the pumping light coming from the pumping light source 52, into the amplification optical fiber 32, and outputs the signals coming from the amplification optical fiber 32, to the output end 12. Each of the pumping light sources 51, 52 is, for example, a semiconductor laser light source and outputs the pumping light of the wavelength that can pump the rare earth element introduced into the amplification optical fibers 31, 32.

In the fiber optic amplifier 2, the pumping light emitted from the pumping light source 51 is supplied via the optical coupler 41 and in the backward direction to the amplification optical fiber 31. The pumping light emitted from the pumping light source 52 is supplied via the optical coupler 42 and in the backward direction to the amplification optical fiber 32. The input signals into the input end 11 propagates through the optical isolator 21 and enters the amplification optical fiber 31 to be amplified therein. The output signals (amplified signals) from the amplification optical fiber 31 propagates through the optical coupler 41 into the amplification optical fiber 32 to be further amplified therein. Then the output signals (amplified signals) from the amplification optical fiber 32 propagates through the optical coupler 42 to be outputted from the output end 12.

Each of the amplification optical fibers 31, 32 according to the second embodiment has the structure similar to that of the amplification optical fiber 31 according to the aforementioned first embodiment (cf. FIGS. 2A and 2B). Accordingly, the second embodiment also effectively suppresses the occurrence of non-degenerative FWM. Particularly, in the second embodiment, since the amplification optical fiber according to the present invention is applied to the final-stage amplification optical fiber 32 where the signal power is maximum, it can effectively suppress the occurrence of non-degenerative FWM.

Further, the inventors also conducted research on the effect of suppressing the normal FWM occurring between multiplexed signals, with the amplification optical fiber according to the present invention.

Figure 11:
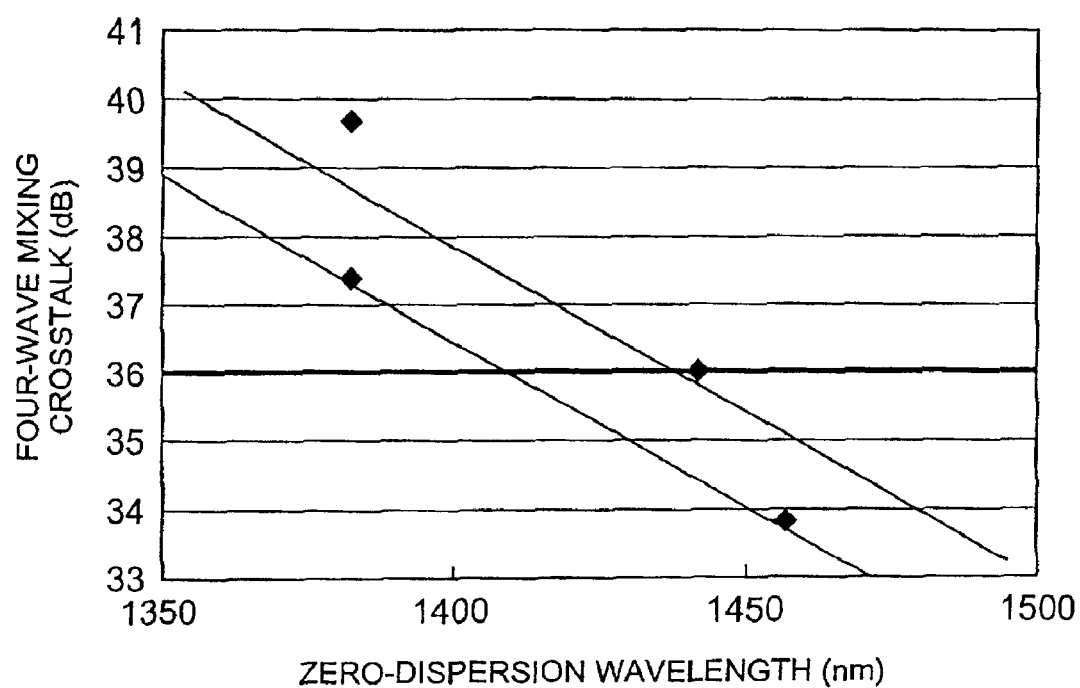
FIG. 11 is a graph showing the relation between normal FWM crosstalk and zero-dispersion wavelength, for plural samples of the amplification optical fiber shown in FIGS. 2A and 2B.

Samples prepared as amplification optical fibers were as follows: the first sample having the effective cutoff wavelength of 1329 nm, the mode field diameter of 5.6 μm at the wavelength of 1550 nm, and the zero-dispersion wavelength of 1382.5 nm; the second sample having the effective cutoff wavelength of 1337 nm, the mode field diameter of 5.62 μm at the wavelength of 1550 nm, and the zero-dispersion wavelength of 1382.5 nm; the third sample having the effective cutoff wavelength of 1256 nm, the mode field diameter of 5.4 μm at the wavelength of 1550 nm, and the zero-dispersion wavelength of 1442.5 nm; the fourth sample having the effective cutoff wavelength of 1287 nm, the mode field diameter of 5.31 μm at the wavelength of 1550 nm, and the zero-dispersion wavelength of 1457.5 nm. The FWM crosstalk of the first sample was 37.471 dB, that of the second sample 39.7385 dB, that of the third sample 36.1385 dB, and that of the fourth sample 33.875 dB. FIG. 11 is a graph showing the relation between FWM crosstalk and zero-dispersion wavelength, for each of these first to fourth samples.

Figure 12:
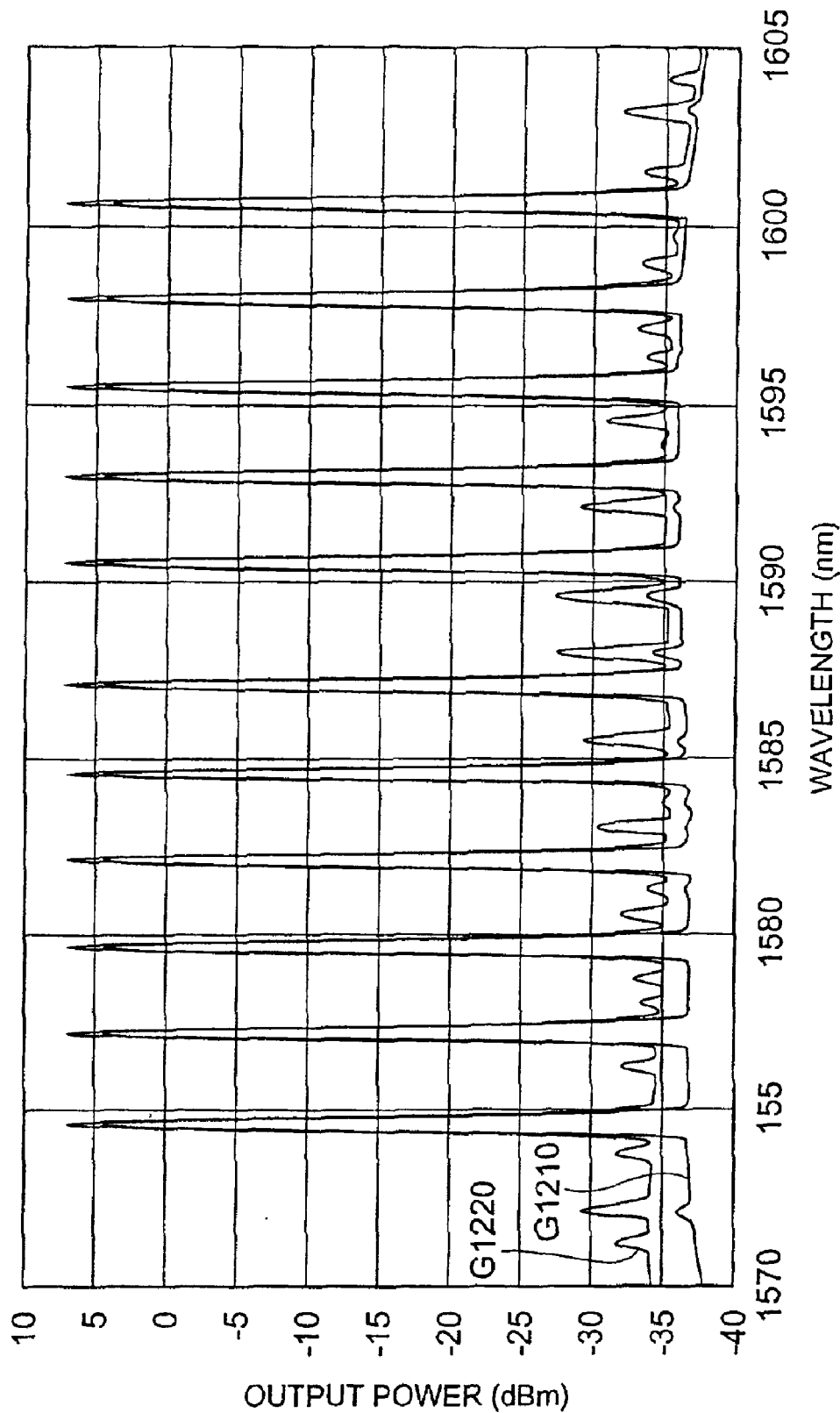
FIG. 12 shows power spectra of output light from respective fiber optic amplifiers making use of three types of typical samples of the amplification optical fiber shown in FIGS. 2A and 2B.
Figure 13:
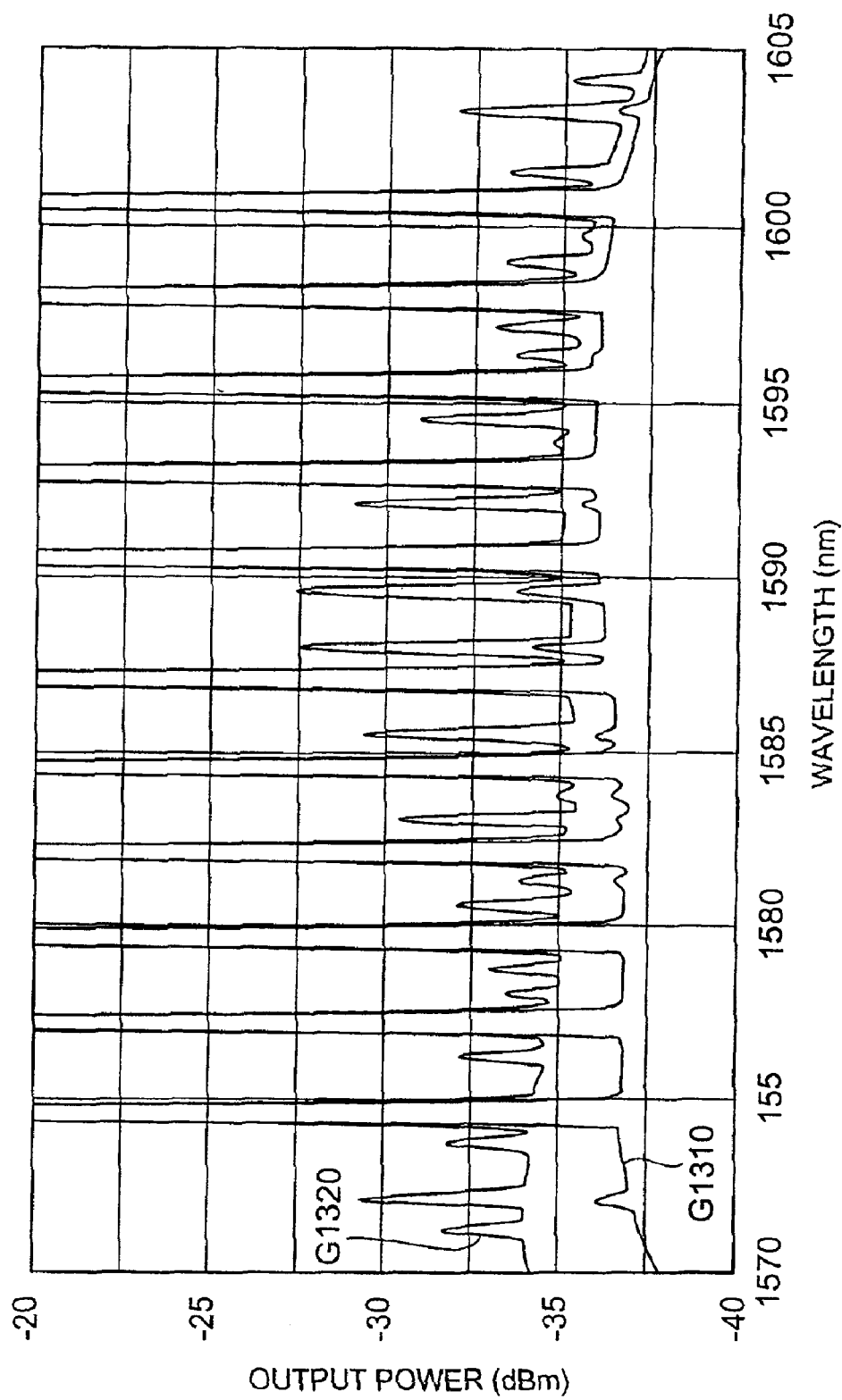
FIG. 13 is an enlarged view of the power spectra shown in FIG. 12.

The inventors also measured the amplification performance of each of fiber optic amplifiers to which these first to fourth samples were applied, for multiplexed signals of eleven channels (wavelengths 1574.5 nm to 1600.6 nm, grid spacing 300 GHz, input power +3 dBm, output power +29 dBm). FIGS. 12 and 13 are power spectra of output light from the respective fiber optic amplifiers, showing the results of the measurement (in which FIG. 13 is an enlarged view of FIG. 12). For definitely showing the difference between the power spectra, FIGS. 12 and 13 show the output power spectrum (equivalent to spectra G1210, G1310) from the fiber optic amplifier to which the second sample is applied and the output power spectrum (equivalent to spectra G1220, G1320) from the fiber optic amplifier to which the fourth sample is applied.

As seen from the power spectra shown in FIGS. 12 and 13, there appeared more conspicuous light components due to the normal FWM between signal channels in the power spectrum from the fiber optic amplifier to which the fourth sample was applied, than in the power spectrum from the fiber optic amplifier to which the second sample was applied. It is seen in consideration of this result that when the zero-dispersion wavelength of the amplification optical fiber is set to 1500 nm or less and, more preferably, to 1400 nm or less, it is feasible simultaneously to achieve the effect of suppressing the normal FWM occurring between signal channels and the effect of suppressing the non-degenerative FWM.

The present invention is not limited to the above-described embodiments, but a variety of modifications thereof can be contemplated. For example, in the amplification optical fibers according to the above embodiments, the optical waveguide region was doped with the element Er as a rare earth element, but it may also be doped with either of the other rare earth elements; e.g., Tm, Pr, Nd, and so on.

According to the present invention, as described above, the fiber optic amplifier is constructed by applying the amplification optical fiber having the zero-dispersion wavelength of not more than the wavelength of the pumping light, specifically 1.5 µm or less, and the effective cutoff wavelength of 1.1 µm or more but not more than the wavelength of the pumping light, specifically 1.1 µm or more but 1.5 µm or less, and it is thus feasible to suppress the occurrence of the non-degenerative FWM, as well as the normal FWM. When the core region of the amplification optical fiber is doped with Er as a rare earth element (also including the case where a part of the core region is doped), the fiber is suitable for amplification of signals belonging to the C-band or the L-band. When the fiber is one wherein the concentration of dopant Er in the core region is 3000 wt.ppm or less, preferably 2500 wt.ppm or less, and more preferably 2000 wt.ppm or less and wherein the absorption loss at the wavelength of 1.53 µm is 10 dB/m or more, the fiber can be shortened without occurrence of concentration quenching. For this reason, the amplification optical fiber according to the present invention is suitably applicable as an optical amplifying medium in the L-band EDFA. Further, when the mode field diameter at the wavelength of 1.55 µm is 4.0 µm or more but 9.0 µm or less, preferably 4.0 µm or more but 7.5 µm or less, the occurrence of the nonlinear optical phenomena is further suppressed.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An amplification optical fiber for amplifying signals under supply of pumping light, said amplification optical fiber comprising:

a core region doped with a rare earth element;

a zero-dispersion wavelength of 1.5 µm or less; and an effective cutoff wavelength of 1.1 µm or more but 1.5 µm or less.

2. An amplification optical fiber according to claim 1, wherein said rare earth element includes erbium.

3. An amplification optical fiber according to claim 2, wherein a concentration of erbium in said core region is 3000 wt.ppm or less and an absorption loss at a wavelength of 1.53 µm is 10 dB/m or more.

4. An amplification optical fiber according to claim 1, further having a mode field diameter of 4.0 µm or more but 9.0 µm or less at a wavelength of 1.55 µm.

5. An amplification optical fiber according to claim 4, further having the mode field diameter of 4.0 µm or more but 7.5 µm or less at the wavelength of 1.55 µm.

6. A fiber optic amplifier comprising:

a pumping light source for emitting pumping light of a predetermined wavelength; and an amplification optical fiber for amplifying signals under supply of said pumping light, said amplification optical fiber comprising:

a core region doped with a rare earth element;

a zero-dispersion wavelength of not more than the wavelength of said pumping light; and an effective cutoff wavelength of 1.1 µm or more but not more than the wavelength of said pumping light.

7. A fiber optic amplifier according to claim 6, wherein the rare earth element in the core region of said amplification optical fiber includes erbium.

8. A fiber optic amplifier according to claim 7, wherein a concentration of erbium in the core region of said amplification optical fiber is 3000 wt.ppm or less and an absorption loss at a wavelength of 1.53 µm is 10 dB/m or more.

9. A fiber optic amplifier according to claim 6, wherein said amplification optical fiber further has a mode field diameter of 4.0 µm or more but 9.0 µm or less at a wavelength of 1.55 µm.

10. A fiber optic amplifier according to claim 9, wherein said amplification optical fiber further has the mode field diameter of 4.0 µm or more but 7.5 µm or less at the wavelength of 1.55 µm.

11. A fiber optic amplifier comprising:

a plurality of amplification optical fibers connected in multiple stages, each amplifying signals under supply of pumping light;

a pumping light supply system for supplying said pumping light to each of said plurality of amplification optical fibers;

wherein at least an amplification optical fiber located in the final stage in a traveling direction of said signals, out of said plurality of amplification optical fibers, comprises:

a core region doped with a rare earth element;

a zero-dispersion wavelength of not more than a wavelength of said pumping light; and an effective cutoff wavelength of 1.1 µm or more but not more than the wavelength of said pumping light.

12. A fiber optic amplifier according to claim 11, wherein said pumping light supply system comprises one or more pumping light sources.

13. A fiber optic amplifier according to claim 11, wherein the rare earth element in the core region of said amplification optical fiber includes erbium.

14. A fiber optic amplifier according to claim 13, wherein a concentration of erbium in the core region of said amplification optical fiber is 3000 wt.ppm or less and an absorption loss at a wavelength of 1.53 μm is 10 dB/m or more.

15. A fiber optic amplifier according to claim 11, wherein said amplification optical fiber further has a mode field diameter of 4.0 μm or more but 9.0 μm or less at a wavelength of 1.55 μm.

16. A fiber optic amplifier according to claim 15, wherein said amplification optical fiber further has the mode field diameter of 4.0 μm or more but 7.5 μm or less at the wavelength of 1.55 μm.

* * * * *